(No Model.)
L. W. FREEMAN.
HORSE HAY RAKE.
No. 348,898. Patented Sept. 7, 1886.
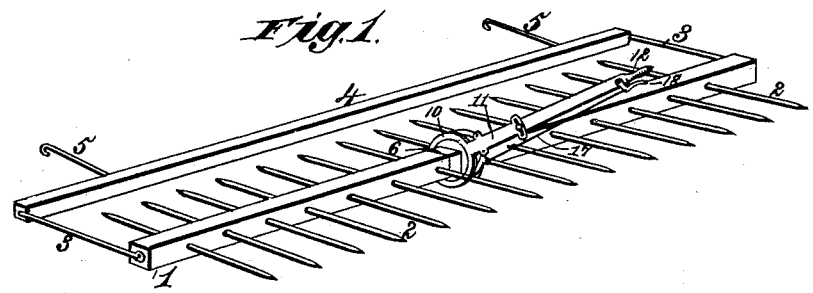
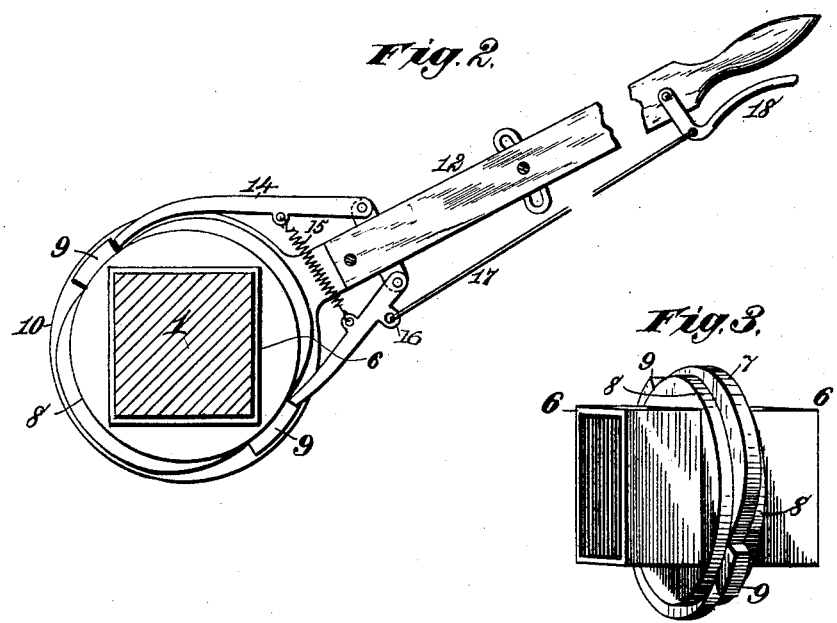
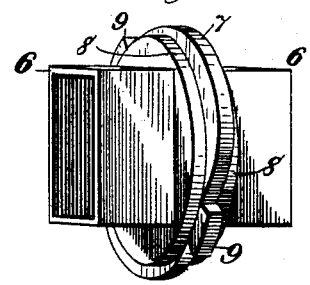
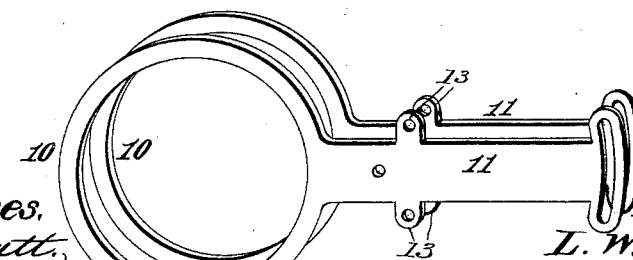
Witnesses.
Inventor
L. W. Freeman.
By James L. Norris.
Atty.

UNITED STATES PATENT OFFICE.

LEANDER W. FREEMAN, OF LIBERTY, INDIANA.

HORSE HAY-RAKE.

SPECIFICATION forming part of Letters Patent No. 348,898, dated September 7, 1886.

Application filed September 26, 1885. Serial No. 178,283. (No model.)

*To all whom it may concern:*

Be it known that I, LEANDER W. FREEMAN, a citizen of the United States, residing at Liberty, in the county of Union and State of Indiana, have invented new and useful Improvements in Horse Hay-Rakes, of which the following is a specification.

This invention relates to that class of hay-rakes in which a horizontal toothed bar traverses the earth, and is adapted to discharge the hay into a windrow at the will of the operator by a half revolution of the toothed bar. This has ordinarily been effected through the medium of pawls and ratchets; and to improve this particular kind of machine and provide a novel dumping mechanism are the objects of my invention, which I accomplish by the construction and combination of devices hereinafter described and claimed, reference being had to the accompanying drawings, in which—

Figure 1 is a perspective view of a revolving hay-rake embodying my invention; Fig. 2, a transverse sectional view through the rake-head, taken at one side of the central metallic ratchet-head; Fig. 3, a detailed perspective view of the central ratchet-head, and Fig. 4 perspective views of the two annular collars, which turn on the opposite sides of the ratchet ring or wheel proper and carry the pawls and operating devices.

In order to enable those skilled in the art to make and use revolving hay-rakes according to my invention, I will now describe the same in detail, referring to the drawings, where—

The number 1 indicates a square or other suitably-shaped rake-head having tines or teeth 2 projecting from two opposite sides. The ends of the rake-head connect by links, rods, or other devices, 3, with a front bar, 4, to which the draft-team is hitched by rods 5, or otherwise.

To the central part of the rake-head is rigidly attached a ratchet-head consisting of a metallic box, 6, conforming to the square or other shape of the rake-head, and formed with a ratchet ring or wheel, 7, and two annular bearings, 8 8, (one on each side of the ratchet ring or wheel,) the wheel having two segment-shaped teeth, 9, projecting outward at points diametrically opposite each other, so as to be on the outer surface of the ratchet-head. An annular collar, 10, is arranged upon each of the annular bearings 8 of the ratchet-head, such collars being provided with outwardly-projecting arms 11, to receive between them the wooden or other handle 12. The arms 11 are each provided adjacent to the collar with an upper and a lower lug or ear, 13, between which are pivoted the rear ends of the two curved pawls 14, which normally rest at their other or engaging ends against the teeth of the ratchet-head, to make the handle rigid and prevent the rake-head from turning, this arrangement placing the pawls outside the ratchet-head. The two pawls are connected by a coiled or other spring, 15, at a point between the two collars and the pivoted ends of the pawls, so that the tendency of the spring is to draw the pawls toward each other and cause their acting ends to automatically engage the ratchet-teeth. The lower pawl is provided with a lug or eye, 16, to which is attached one end of a rod or chain, 17, the other end of which is attached to the angle of an angle-lever, 18, which is pivoted at one end to the handle and at its other end properly fashioned, so that the hand of the operator grasping the rear ends of the handle can actuate the angle-lever, and thereby move the lower pivoted pawl out of engagement with the ratchet-head when it is desired to discharge the hay into a windrow. It will be understood that the rake-head traverses the earth with one series of tines or teeth in advance and approximately parallel to but not in direct contact with the earth. When sufficient hay has been collected by the tines, and it is desired to dump the same into a windrow, the attendant operates the angle-lever to move the lower pivoted pawl from engagement with its ratchet-tooth, whereupon the attendant lifts the handles and through the upper pawl turns the rake-head, and thereby causes the points of the front teeth to penetrate and engage the ground. The draft of the team acting on the rake-head causes it to make a half-revolution, thus discharging the load and bringing the other set of tines or teeth into operative position in advance of the rake-head. The attendant having previously released the angle-lever, when the rake-head has completed its half-revolution the pawls automatically engage the ratchet-head and effect the desired rigidity of the handle, as well as afford means for preventing rotation of the rake-head until the proper time. It will be seen that the upper pawl effects the initial turning of the rake-head when the handle is elevated, and that the lower pawl prevents rotation of the rake-head until released from engagement with the rake-head.

By pivoting the pawls and arranging them as described they never revolve or move with the ratchet, but simply move when the handle is moved. I thus avoid placing the pawls within annular bands, and simplify the construction, so as to provide efficient and economical revolving hay-rakes.

What I claim is—

The combination, with the rake-head, of a centrally-attached metallic boxing having an attached radially-projecting toothed ring or wheel provided at each side with an annular bearing, so that the ring or wheel serves as a supporting-runner for the rake-head to traverse the ground, the two collars loosely mounted, respectively, on the annular bearings, and each provided with a rearward extension, a handle clamped in place between the extensions, the two pawls pivoted to said extensions, and a lever connected with the lower pawl, substantially as described.

In testimony whereof I affix my signature in presence of two witnesses.

LEANDER W. FREEMAN.

Witnesses:
JAMES ISRAEL,
JOSEPH STEWART.